United States Patent
Sone et al.

(10) Patent No.: US 12,472,888 B2
(45) Date of Patent: Nov. 18, 2025

(54) WIRING MODULE WITH SEGMENTED-RIGID MEMBER

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Kosuke Sone, Osaka (JP); Takuya Taniguchi, Osaka (JP); Ai Takehisa, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 187 days.

(21) Appl. No.: 18/281,919

(22) PCT Filed: Mar. 11, 2022

(86) PCT No.: PCT/JP2022/010781
§ 371 (c)(1),
(2) Date: Sep. 13, 2023

(87) PCT Pub. No.: WO2022/196546
PCT Pub. Date: Sep. 22, 2022

(65) Prior Publication Data
US 2024/0166145 A1    May 23, 2024

(30) Foreign Application Priority Data
Mar. 15, 2021   (JP) ................. 2021-041390

(51) Int. Cl.
*H02G 3/04* (2006.01)
*B60R 16/02* (2006.01)

(52) U.S. Cl.
CPC .......... *B60R 16/0215* (2013.01); *H02G 3/04* (2013.01)

(58) Field of Classification Search
CPC ...... B60R 16/0215; B60R 16/02; H02G 3/04; H02G 3/0406; H02G 3/0608; H02G 3/30
(Continued)

(56) References Cited

U.S. PATENT DOCUMENTS

2015/0380916 A1   12/2015   Shimada et al.
2022/0176898 A1    6/2022   Sone et al.

FOREIGN PATENT DOCUMENTS

JP   2000-335327 A   12/2000
JP   2013-135555 A    7/2013
(Continued)

OTHER PUBLICATIONS

International Search Report issued on May 10, 2022 for WO 2022/196546 A1 (4 pages).

*Primary Examiner* — Timothy J Thompson
*Assistant Examiner* — Michael F McAllister
(74) *Attorney, Agent, or Firm* — Venjuris, P.C.

(57) ABSTRACT

An object is to facilitate incorporation of a wiring module into a vehicle. A wiring module includes: a sheet-shaped member that extends in a planar shape relative to a mounting target portion of a vehicle; a transmission member held by the sheet-shaped member; and a rigid member provided on the sheet-shaped member, wherein the rigid member includes a plurality of divided members, the rigid member is provided with a plurality of attachment parts configured to be attached to the mounting target portion, the plurality of divided members include a first divided member and a
(Continued)

second divided member that are coupled so as to be displaceable to each other, and a coupling portion between the first divided member and the second divided member is provided between the plurality of attachment parts.

9 Claims, 6 Drawing Sheets

(58) Field of Classification Search
USPC .......................................................... 174/68.1
See application file for complete search history.

(56) References Cited

FOREIGN PATENT DOCUMENTS

| | | |
|---|---|---|
| JP | 2015-113095 A | 6/2015 |
| JP | 2018-090229 A | 6/2018 |

WIRING MODULE WITH SEGMENTED-RIGID MEMBER

CROSS REFERENCE TO RELATED APPLICATIONS

This application is a national phase of PCT application No. PCT/JP2022/010781, filed on 11 Mar. 2022, which claims priority from Japanese patent application No. 2021-041390, filed on 15 Mar. 2021, all of which are incorporated herein by reference.

TECHNICAL FIELD

The present disclosure relates to a wiring module.

BACKGROUND

Patent Document 1 discloses a wire harness assembly including a sheet-shaped soundproofing member, a sheet-shaped protective member placed on top of the soundproofing member, and a wire harness including at least one wire routed between the soundproofing member and the protective member.

PRIOR ART DOCUMENT

Patent Document

Patent Document 1: JP 2018-090229 A

SUMMARY OF THE INVENTION

Problems to be Solved

If the above-described wire harness assembly partially sags when being mounted to the ceiling of a vehicle, it becomes difficult to perform the mounting operation. For this reason, a proposal has been made to attach a rigid member to the wire harness assembly, thus suppressing sagging of the wire harness assembly.

However, in order to suppress sagging of the wire harness assembly, it is desirable that the rigid member also extends over a wide area relative to the wire harness assembly. This means that the rigid member will be attached to the ceiling at a plurality of locations. In this case, due to, for example, the tolerance for a plurality of attachment positions on the ceiling and the tolerance for a plurality of attachment positions on the rigid member, it may be difficult to mount the rigid member to the ceiling.

Therefore, an object of the present disclosure is to facilitate incorporation of a wiring module into a vehicle.

Means to Solve the Problem

A wiring module according to the present disclosure is a wiring module including: a sheet-shaped member that extends in a planar shape relative to a mounting target portion of a vehicle; a transmission member held by the sheet-shaped member; and a rigid member provided on the sheet-shaped member, wherein the rigid member includes a plurality of divided members, the rigid member is provided with a plurality of attachment parts configured to be attached to the mounting target portion, the plurality of divided members include a first divided member and a second divided member that are coupled so as to be displaceable to each other, and a coupling portion between the first divided member and the second divided member is provided between the plurality of attachment parts.

Effect of the Invention

According to the present disclosure, a wiring module can be easily incorporated into a vehicle.

DETAILED DESCRIPTION TO EXECUTE THE INVENTION

Description of Embodiments of the Present Disclosure

First, aspects of the present disclosure will be listed and described.

A wiring module according to the present disclosure is as follows.

(1) A wiring module including: a sheet-shaped member that extends in a planar shape relative to a mounting target portion of a vehicle; a transmission member held by the sheet-shaped member; and a rigid member provided on the sheet-shaped member, wherein the rigid member includes a plurality of divided members, the rigid member is provided with a plurality of attachment parts configured to be attached to the mounting target portion, the plurality of divided members include a first divided member and a second divided member that are coupled so as to be displaceable to each other, and a coupling portion between the first divided member and the second divided member is provided between the plurality of attachment parts.

With this wiring module, the first divided member and the second divided member are coupled between the plurality of attachment parts so as to be displaceable. Accordingly, when the wiring module is mounted to the mounting target portion, the plurality of attachment parts are aligned with the position of an attachment target portion of the mounting target portion as a result of the first divided member and the second divided member being displaced relative to each other. Thus, the wiring module can be easily incorporated into the mounting target portion of the vehicle.

(2) The wiring module according to (1), wherein the first divided member and the second divided member may be coupled so as to be movable toward and away from each other, to be swingable in a thickness direction of the sheet-shaped member, and to be swingable in a direction intersecting a direction in which the plurality of divided members move toward or away from each other and the thickness direction of the sheet-shaped member. Accordingly, the plurality of attachment parts are moved relative to each other in three directions, and the positions relative to each other are adjusted. Thus, the wiring module is easily incorporated into the mounting target portion of the vehicle.

(3) The wiring module according to (1) or (2), wherein the first divided member may include a coupling piece that extends toward the second divided member side along a direction of the sheet-shaped member, the second divided member may include a first clamping piece and a second clamping piece that extend along the direction of the sheet-shaped member, a gap having a dimension greater than or equal to a thickness of the coupling piece may be formed between the first clamping piece and the second clamping piece, and the first divided member and the second divided member may be coupled to each other, with the coupling piece being disposed between the first clamping piece and the second clamping piece. Thus, the first divided member and the second divided member can swing in the thickness direction of the sheet-shaped member within a range in which the coupling piece can move between the first clamping piece and the second clamping piece.

(4) The wiring module according to (3), wherein the coupling piece may include a protrusion that extends along a boundary between the first divided member and the second divided member, and that protrudes toward one surface side of the coupling piece, the first clamping piece may extend along the boundary between the first divided member and the second divided member, a recessed groove part capable of housing the protrusion may be formed in the first clamping piece, the protrusion may have a dimension larger than a dimension of the recessed groove part in the direction in which the first divided member and the second divided member move toward or away from each other, and the second clamping piece may oppose the coupling piece on a side opposite to the first clamping piece, and keep the protrusion housed in the recessed groove part. In this case, as a result of the protrusion moving inside the recessed groove part, the first divided member and the second divided member can move toward and away from each other, and can swing in a direction that intersects a direction in which the plurality of divided members move toward or away from each other and the thickness direction of the sheet-shaped member.

(5) The wiring module according to (4), wherein the first divided member may include a first main body part that is flat, and the coupling piece may be formed as a separate piece from the first main body part, and is attached to a lateral portion of the first main body part so as to protrude outward. Thus, by adjusting the shape of the coupling piece that is attached to the first main body part, it is possible to adjust the distance between the first divided member and the second divided member, and adjust the displaceable amount between the first divided member and the second divided member.

(6) The wiring module according to (4) or (5), wherein the second divided member may include a second main body part that is flat, the first clamping piece may be formed as a single piece with the second main body part, the second clamping piece may be formed as a separate piece from the second main body part, the first clamping piece may include a pair of supporting protrusions that support the first clamping piece outside opposite ends of the recessed groove part, and opposite end portions of the second clamping piece may be attached to the first clamping piece at fixed positions, while in contact with the pair of supporting protrusions. In this case, opposite end portions of the second clamping piece are attached to the first clamping piece at fixed positions while in contact with the two supporting protrusions. Accordingly, the range in which the coupling piece can be varied between the first clamping piece and the second clamping piece can be easily made constant.

(7) The wiring module any one of embodiments (3) to (6), wherein one of the first divided member and the second divided member may be provided with a pair of locking pieces each including a locking protrusion, the other of the first divided member and the second divided member may be provided with a pair of receiving recesses in which the corresponding locking protrusions can be disposed, and each of the receiving recesses may be set to a size that allows movement of the corresponding locking protrusion in the thickness direction of the sheet-shaped member and the direction in which the first divided member and the second divided member move toward or away from each other. Thus, as a result of the locking protrusions moving inside the receiving recesses, the first divided member and the second divided member can be displaced relative to each other in multiple directions while being coupled to each other.

(8) The wiring module according to (7), wherein the locking pieces may be provided between the first clamping piece and the second clamping piece on the second divided member. Thus, the locking pieces are protected between the first clamping piece and the second clamping piece.

(9) The wiring module according to (7) or (8), wherein the first divided member may include an auxiliary piece capable of coming into contact with an outer surface of at least one of the first clamping piece and the second clamping piece. In this case, a load generated when the first divided member and the second divided member are displaced relative to each other can also be received by the auxiliary piece in a dispersed manner.

DETAILS OF EMBODIMENTS OF THE PRESENT DISCLOSURE

Specific examples of the wiring module according to the present disclosure will be described below with reference to the drawings. It should be noted that the present disclosure is not limited to these examples, but is defined by the claims, and is intended to include all modifications which fall within the scope of the claims and the meaning and scope of equivalents thereof.

Embodiment 1

In the following, a wiring module according to Embodiment 1 will be described.

<Vehicle into which Wiring Module is Incorporated>

Figure 1:
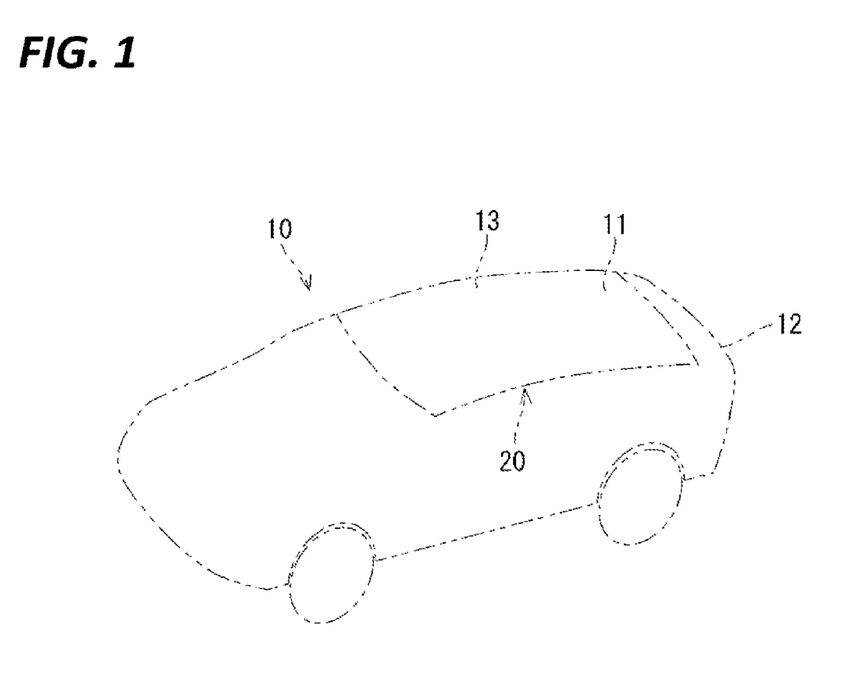
FIG. 1 is a schematic perspective view showing an exemplary vehicle into which a wiring module according to Embodiment 1 is incorporated.

FIG. 1 is a schematic perspective view showing an exemplary vehicle into which the wiring module is incorporated. A vehicle 10 includes a body 12. The body 12 is a portion that forms an outer shape of the vehicle 10. The body 12 may be a monocoque body, or may be a body mounted on a rudder frame. Here, the body 12 includes lateral panels surrounding a vehicle cabin and a roof panel 13, as well as boarding door panels for a passenger to get in and out of the vehicle, and a rear door panel to put in and take out baggage, and so forth. The body 12 may be made of metal, or may be made of resin. The body 12 may also be formed by a combination of metal and resin. A plate-shaped portion of the body 12 that covers an upper side of the vehicle cabin constitutes a roof panel 13. That is, the roof panel 13 forms a roof portion of the vehicle 10. The roof panel 13 may be partially or entirely curved in order to form an external shape of the body 12. The roof panel 13 may be made of metal, or may be made of resin. The roof panel 13 may be formed by a combination of metal and resin. Here, the roof panel 13 has an antenna hole 13*h* formed therein (see FIG. 2).

The wiring module 20 is incorporated into the vehicle 10. In the present embodiment, an example will be described in which the wiring module 20 is incorporated into a roof portion 11 including the roof panel 13. The wiring module may also be incorporated into a door panel or the like.

Figure 2:
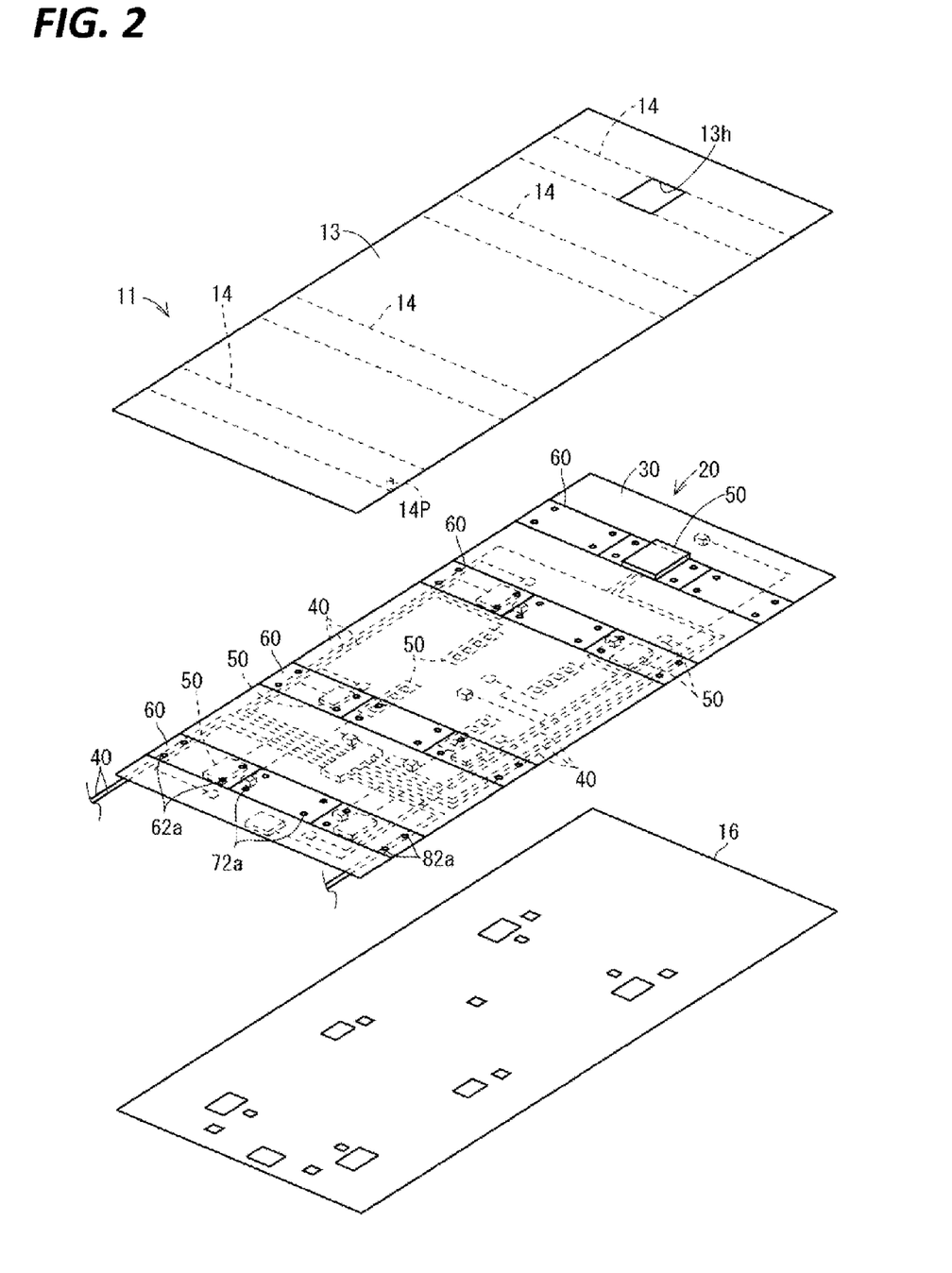
FIG. 2 is a perspective view showing the wiring module.

FIG. 2 is a perspective view showing the wiring module 20. In FIG. 2, the roof portion 11 is shown. A transmission member shown in FIG. 2 shows a schematic path, and may include a plurality of wires even when it is depicted as a single line. As the roof portion 11, the roof panel 13 described above and an interior member 16 are shown. An inner surface (downward facing surface) of the roof panel 13 is provided with at least one roof-reinforcing member 14. The roof-reinforcing member 14 may be a member called a roof reinforcement or a roof stay, for example. In the present embodiment, the roof-reinforcing member 14 is an elongated member, and a plurality of roof-reinforcing members are provided at intervals in the front-rear direction of the roof panel 13. The roof-reinforcing members 14 are disposed along the width direction of the roof panel 13. When the roof panel 13 is metal, roof-reinforcing members 14 made of metal may be welded to the inner surface of the roof panel 13. The wiring module 20, the interior member 16, and so forth may be attached to the roof-reinforcing members 14. In this respect, the roof-reinforcing members 14 are a type of bracket.

In the present embodiment, each of the roof-reinforcing members 14 is an exemplary mounting target portion to which the wiring module 20 is to be attached. In this example, a rigid member 60 of the wiring module 20 is attached to a mounting target portion. The mounting target portion may be a door panel.

The interior member 16 is a plate-shaped member made of resin or the like. The interior member 16 is a portion that forms a ceiling shape in the vehicle interior. The interior member 16 may be partially or entirely curved. The interior member 16 is attached to the roof panel 13 on the lower side thereof. The interior member 16 is a portion that is exposed to the vehicle interior. The interior member 16 may be called a roof liner. In the present embodiment, the wiring module 20 is provided between the roof panel 13 and the interior member 16.

<Overall Structure of Wiring Module>

The wiring module 20 includes a sheet-shaped member 30, at least one transmission member 40, and at least one rigid member 60. In the present embodiment, the wiring module 20 further includes at least one roof-side device 50. The roof-side device 50 may be omitted.

The sheet-shaped member 30 is a sheet-shaped member that extends in a planar shape relative to a mounting target portion of the vehicle. In the present embodiment, the sheet-shaped member 30 is incorporated into the roof portion 11 so as to extend in a planar shape relative to the roof panel 13 and the interior member 16. For example, the sheet-shaped member 30 may be disposed extending over 80% or more of the area of the roof portion 11. For example, the sheet-shaped member 30 may be disposed extending over the entire area above the headrests of a plurality of passenger seats in the vehicle interior. As a result of the sheet-shaped member 30 being disposed extending relative to the roof portion 11, the transmission member 40 can be supported in a region as large as possible relative to the roof portion 11. In addition, a function of the sheet-shaped member 30, which will be described below, can be performed in a region as large as possible relative to the roof portion 11.

The sheet-shaped member 30 may include a layer that performs at least one of a heat insulation function, a soundproofing function, and a radio wave shielding function. That is, the sheet-shaped member 30 may be a sheet that performs, in addition to the function for allowing the transmission member 40 and the rigid member 60 to be fixed thereto, at least one of a heat insulation function, a soundproofing function, and a radio wave shielding function.

For example, the sheet-shaped member 30 may include a non-woven layer. A non-woven layer is a layer in which a plurality of fibers are entangled with each other without being woven, and is an example of a layer that achieves insulation to suppress the transmission of heat between one principal surface side and another principal surface side of the sheet-shaped member 30. The insulation layer may be a layer that reflects heat radiation energy. The insulation layer may be a layer having a lower thermal conductivity than other layers. For example, in addition to the non-woven sheet, a sheet having fine gaps such as a foamed sheet may be used as the insulation layer. An insulation coating material or a thermal barrier coating material may also be used as the insulation layer.

The non-woven layer can also be regarded as an example of a layer that achieves soundproofing to suppress transmission of sound between the one principal surface side and the other principal surface side of the sheet-shaped member 30. The layer that achieves soundproofing may reflect sound, or absorb sound energy as thermal energy. For example, in addition to the non-woven sheet, a sheet having fine gaps such as a foamed sheet may be used as the soundproofing layer. A sound absorption coating material may also be used as the soundproofing layer.

The insulation layer and the soundproofing layer may be provided as physically separate layers.

For example, the sheet-shaped member 30 may include a radio wave shielding layer. The radio wave shielding layer is a layer that suppress transmission of radio waves between the one principal surface and the other principal surface of the sheet-shaped member 30. The radio wave shielding layer may have a radio wave shielding property for all frequencies. The radio wave shielding layer may have a selective radio wave shielding property for some frequency bands. In this case, radio waves of some frequency bands may be at least either reflected or absorbed by the radio wave shielding layer. The radio wave shielding layer may be a layer made of a metal foil of aluminum, iron or the like. As the radio wave shielding layer having a selective radio wave shielding property, a well-known frequency selective surface (FSS) may be used. For example, the frequency selective surface may have a configuration in which a unit cell (element) is formed on a base film made of resin or the like, using a metal foil or the like. Such a frequency selective surface has the property of selectively shielding radio waves of one or more frequency bands according to the frequency characteristics of the unit cell (element), and allowing passage of radio waves of other frequency bands. The radio wave shielding layer having a selective radio wave shielding property may be formed by printing a conductive paste or the like directly onto the insulation layer or the soundproofing layer.

When the sheet-shaped member 30 includes the radio wave shielding layer, it is preferable that an external communication antenna unit is provided on the vehicle exterior side of the radio wave shielding layer. With this configuration, radio waves that are emitted from an external communication antenna are shielded by the radio wave shielding layer, and thus are less likely to propagate to the vehicle interior side. In addition, radio waves that are emitted from the external communication antenna propagate toward the outside without being shielded by the radio wave shielding layer.

When it is assumed that the sheet-shaped member 30 includes the radio wave shielding layer, it is preferable that an interior-side antenna is provided on the vehicle interior side of the radio wave shielding layer. With this configuration, radio waves that are emitted from the interior-side antenna and an interior device in the vehicle interior are shielded by the radio wave shielding layer, and thus are less likely to propagate toward the vehicle exterior side. On the other hand, radio waves that are emitted by the interior-side antenna propagate toward the vehicle interior side, which is located opposite to the radio wave shielding layer relative to the interior-side antenna. Accordingly, wireless communication can be performed favorably with interior devices via the interior-side antenna. When the interior-side antenna performs non-contact power feeding for the interior device, radio waves (power) will not leak outside the vehicle, and thus the non-contact power feeding is efficiently performed.

When the sheet-shaped member 30 includes a plurality of layers, the layers may be simply placed on top of one another. The layers may be fixed to one another using double-sided tape or an adhesive, or through welding or the like. The layers may be placed on top of one another in any order. For example, the radio wave shielding layer may be provided below the non-woven layer. When the sheet-shaped member includes a plurality of functional layers, it is not essential that the plurality of functional layers are disposed overlapping each other in the thickness direction of the sheet-shaped member. The plurality of functional layers may be provided in different regions within a region in which the sheet-shaped member extends. For example, the plurality of functional layers may be provided side by side within a region in which the sheet-shaped member extends. Other functional layers may be partially provided for one functional layer.

The transmission member 40 is a member that transmits electricity or light or the like, and at least one end thereof is provided along a wiring path that is connected to the roof-side device 50. For example, the transmission member 40 may be an ordinary wire including a core wire and a coating around the core wire, a bare conductive wire, a shielded wire, an electric cable, an enamel wire, a nichrome wire, a coaxial wire, an optical fiber, or the like. That is, the transmission member 40 may be a linear member that transmits electricity. Various signal lines or various power lines may be employed as the linear member that transmits electricity. The linear transmission member that transmits electricity may be a single linear object or a composite of a plurality of linear objects (a twisted wire, a cable obtained by assembling a plurality of linear objects and covering the linear objects with a sheath, etc.). The transmission member may be formed, for example, by applying a conductive coating material to a sheet-shaped member, or etching copper foil. Here, a description is given assuming that the transmission member 40 is a wire.

The transmission member 40 is provided on the sheet-shaped member 30. Here, the transmission member 40 being provided on the sheet-shaped member 30 means that a medium that transmits electricity or light is formed on the sheet-shaped member so as to form a path for electricity or light. Therefore, the transmission member 40 provided on a sheet-shaped member includes, in addition to a transmission member directly formed on the sheet-shaped member 30 by applying a conductive coating material thereto or etching a copper foil thereon, a linear transmission member 40 that is manufactured separately from the sheet-shaped member 30 and that is attached in a shape so as to form a certain path along one principal surface or both principal surfaces of the sheet-shaped member. A specific configuration for supporting the transmission member 40 is not particularly limited.

For example, the transmission member 40 may be fixed to one principal surface of the sheet-shaped member 30. For example, the transmission member 40 may be welded to one principal surface of the sheet-shaped member 30. The thus formed welded part is in a state in which a portion of at least one of the transmission member 40 and the sheet-shaped member 30 is melted, and the two members are welded to each other. The welding between the transmission member 40 and the sheet-shaped member 30 may be achieved through ultrasonic welding or heat welding. The transmission member 40 and the sheet-shaped member 30 may be welded to each other by dissolving a surface of at least one of the transmission member 40 and the sheet-shaped member 30 using a solvent. For example, the transmission member 40 may be fixed to the sheet-shaped member 30 using an adhesive, double-sided tape, or the like. For example, the transmission member 40 may be sewn to the sheet-shaped member 30 using a sewing thread, or the like. For example, in a state in which the transmission member 40 is disposed on one principal surface of the sheet-shaped member 30, pressure-sensitive adhesive tape may be attached from the outside of the one principal surface of the sheet-shaped member 30 so as to straddle the transmission member 40, thereby fixing the transmission member 40 to the one principal surface of the sheet-shaped member 30. It is not necessary for the transmission member 40 to be fixed to only one principal surface of the sheet-shaped member 30. The transmission member 40 may have both a portion that is fixed to one principal surface of the sheet-shaped member 30, and a portion that is fixed to another principal surface of the sheet-shaped member 30. In this case, the transmission member 40 may be attached to an intermediate portion or an end edge portion of the sheet-shaped member 30 so as to pass through the sheet-shaped member 30 from the one principal surface toward the other principal surface.

For example, the transmission member 40 may be fixed to the sheet-shaped member 30 by being sandwiched between two sheets. For example, when the sheet-shaped member 30 includes a plurality of layers, the transmission member 40 may be sandwiched between sheets that constitute the layers. In this case, the two sheets that sandwich the transmission member 40 may be fixed to each other through welding, or may be fixed using an adhesive or double-sided tape.

Here, the transmission member 40 is mainly provided on a surface of the sheet-shaped member 30 that is located on the interior member 16 side.

The transmission member 40 is connected to the roof-side device 50. The roof-side device 50 transmits or receives an electric signal or an optical signal via the transmission member 40. Alternatively, the roof-side device 50 is supplied with power or distributes power via the transmission member 40. The connection between the transmission member 40 and the roof-side device 50 may be achieved via a connector. The transmission member 40 may be directly introduced into the roof-side device 50, and be directly connected to an electrical element in the roof-side device 50. One end portion of the transmission member 40 may be drawn from the sheet-shaped member 30. The drawn end portion of the transmission member 40 may be drawn to a pillar or the like, and be connected to an electronic control unit or a power supply or the like that is located below the roof portion 11 in the vehicle body.

The roof-side device 50 is disposed on the roof portion 11, and serves as a connection destination of the transmission member 40. As the roof-side device 50, for example, an electronic control unit, a lamp (in particular, a map lamp or a room lamp), a speaker, an interior camera, a monitor, a projection device, an external communication antenna, an interior-side antenna, and the like are envisioned.

The roof-side device 50 may be held by the sheet-shaped member 30, the roof panel 13, or by the interior member 16. In the present embodiment, an example in which the roof-side device 50 is held by the sheet-shaped member 30 is described. When the roof-side device 50 is provided on the roof panel 13 or the interior member 16, the transmission member 40 and the roof-side device 50 may be connected to each other via a connector, with the sheet-shaped member 30 being disposed between the roof panel 13 and the interior member 16. The roof-side device 50 may be disposed at any position on the sheet-shaped member 30 or the roof portion 11. Preferably, the roof-side device 50 is fixed at a position suitable for the function that the roof-side device 50 performs for the sheet-shaped member 30 or the roof portion 11. For example, assuming that the roof-side device 50 is a map lamp, the roof-side device 50 may be fixed to a portion where it is disposed at a position an obliquely forward and upward of a front seat. For example, assuming that the roof-side device 50 is an interior-side antenna, the roof-side device 50 may be fixed to a portion where it is disposed at a position above a front seat or a rear seat.

Even when the roof-side device 50 is held by the sheet-shaped member 30, the roof-side device 50 may ultimately be fixed to the roof panel 13 or the interior member 16. Therefore, it is sufficient that the roof-side device 50 is held by the sheet-shaped member 30 with a holding force sufficient to hold the roof-side device 50 at a fixed position on the sheet-shaped member 30. For example, the roof-side device 50 may be fixed to the sheet-shaped member 30 using an adhesive, a pressure-sensitive adhesive, double-sided tape or the like. The roof-side device 50 may be fixed to the sheet-shaped member 30 through screwing, pinning, or the like. The roof-side device 50 may be fixed to the sheet-shaped member 30 via the rigid member 60. In this case, the roof-side device 50 may be fixed to the rigid member 60 using an adhesive, a pressure-sensitive adhesive, double-sided tape, or the like, or through screwing, pinning, or the like.

The sheet-shaped member 30 is provided with the rigid member 60. The rigid member 60 imparts resistance to deformation to the sheet-shaped member 30. It is preferable that the rigid member 60 is more rigid than the sheet-shaped member 30. Here, the level of rigidity can be evaluated, for example, by taking a surface of the rigid member 60 that is orthogonal to the longitudinal direction thereof as a reference surface, and using the flexural rigidity of the rigid member 60 on the reference surface, and a flexural rigidity of the reference surface of the sheet-shaped member 30 in a partial region in which the rigid member 60 is provided. For example, the sheet-shaped member 30 may be a stack of an aluminum foil and a non-woven fabric, and the rigid member 60 may be a plate member or a rod member made of a solid resin (e.g., PP (polypropylene), PA (polyamide), etc.). The rigid member 60 may be a member that has been reduced in weight while having strength, such as a member with a honeycomb structure. The rigid member 60 may be made of a metal such as iron or aluminum. A more specific example of the rigid member 60 will be described later.

The rigid member 60 is fixed to the sheet-shaped member 30 using an adhesive, a pressure-sensitive adhesive, double-sided tape, or through welding (ultrasonic welding, thermal welding, etc.) or the like. The rigid member 60 may be fixed to the sheet-shaped member 30 through screwing, pinning, or the like. Here, the rigid member 60 has an elongated rectangular plate shape. The length of the rigid member 60 is set to be the same as the width of the sheet-shaped member 30. Within an extent that an edge of the sheet-shaped member 30 does not hang directly down, the length of the rigid member 60 may be smaller than the width of the sheet-shaped member 30 (e.g., smaller within the range of 20 cm or less). The rigid member 60 is disposed on a surface of the sheet-shaped member 30 that is located on the roof panel 13 side.

In the present embodiment, a plurality of (here, four) rigid members 60 are fixed to the sheet-shaped member 30. The longitudinal direction of the rigid members 60 extend along the width direction of the sheet-shaped member 30. Accordingly, portions of the sheet-shaped member 30 where the rigid members 60 are provided are kept such that sagging in the width direction is suppressed.

The plurality of rigid members 60 are provided at intervals in the front-rear direction relative to the sheet-shaped member 30. Accordingly, the sheet-shaped member 30 can be bent between the plurality of rigid members 60. When the wiring module 20 is stored or transported, for example, the storage space or the transport space of the wiring module 20 can be reduced by folding the sheet-shaped member 30 between the plurality of rigid members 60.

The placement regions of the rigid members 60 on the sheet-shaped member 30 are, for example, regions in which a mounting target portion to which the rigid members 60 are to be attached is provided. In the present embodiment, the rigid members 60 are provided below the corresponding roof-reinforcing members 14. The rigid members 60 may be attached to the roof-reinforcing members 14 in any manner. For example, each roof-reinforcing member 14 may be provided with retaining clip members 14P made of resin (only one of them is shown in FIG. 2) so as to protrude downward, and the clip members 14P may be locked to attachment parts 62a, 72a, and 82a, which are holes formed in the rigid members 60, so as not to be dislodged therefrom. Clip members provided on the rigid members may be locked to locking holes formed in the roof-reinforcing members. Additionally, the rigid members 60 may be attached to the roof-reinforcing members 14 through screwing, riveting, or the like.

A planar shape is likely to be maintained at portions of the sheet-shaped member 30 at which the rigid members 60 are provided. This facilitates the operation of mounting the wiring module 20 to the roof panel 13.

<Rigid Member>

Figure 3:
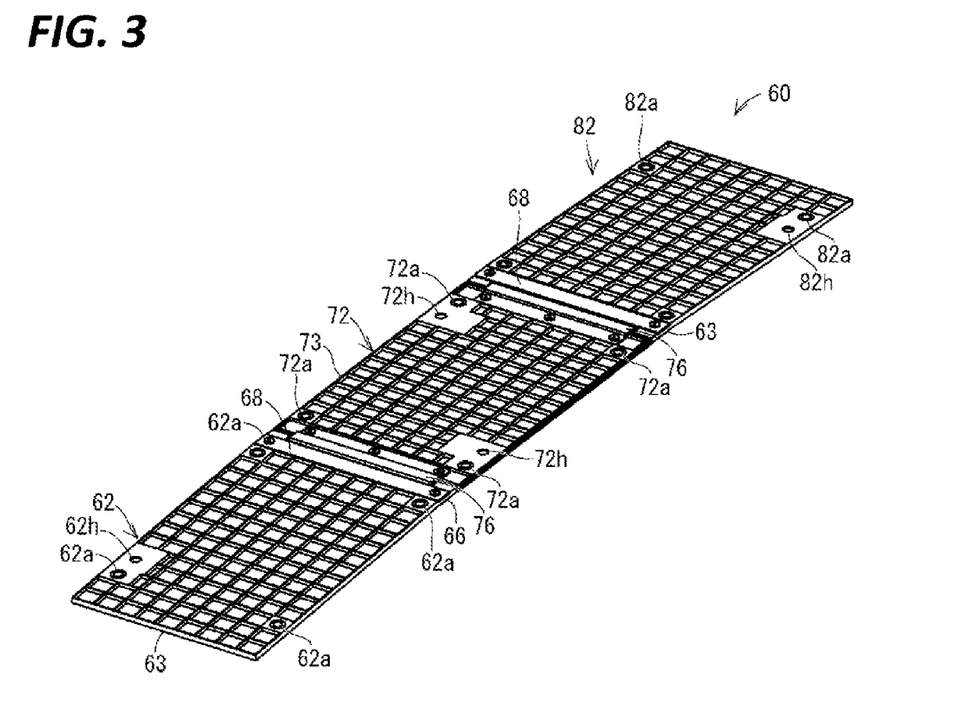
FIG. 3 is a perspective view showing a rigid member.
Figure 4:
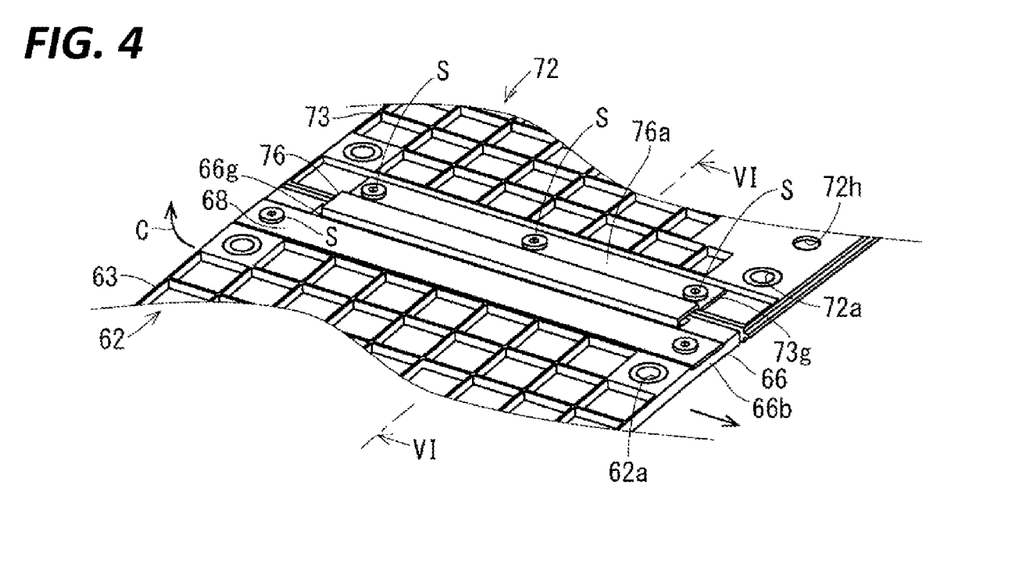
FIG. 4 is a partially enlarged perspective view of the rigid member.
Figure 5:
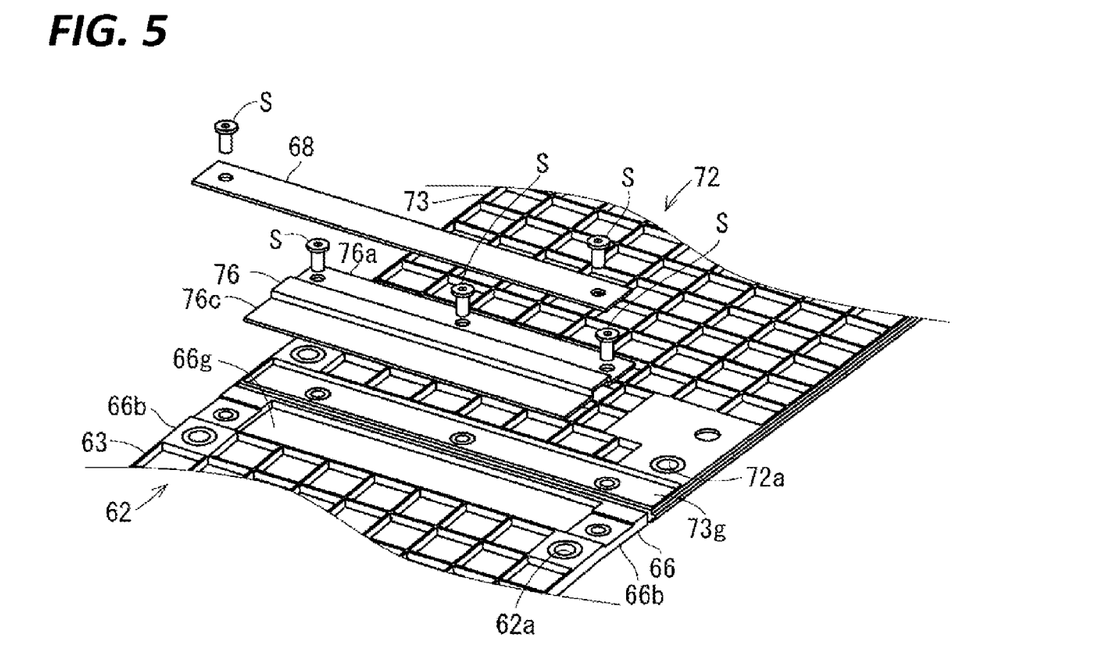
FIG. 5 is a partially exploded perspective view of the rigid member.
Figure 6:
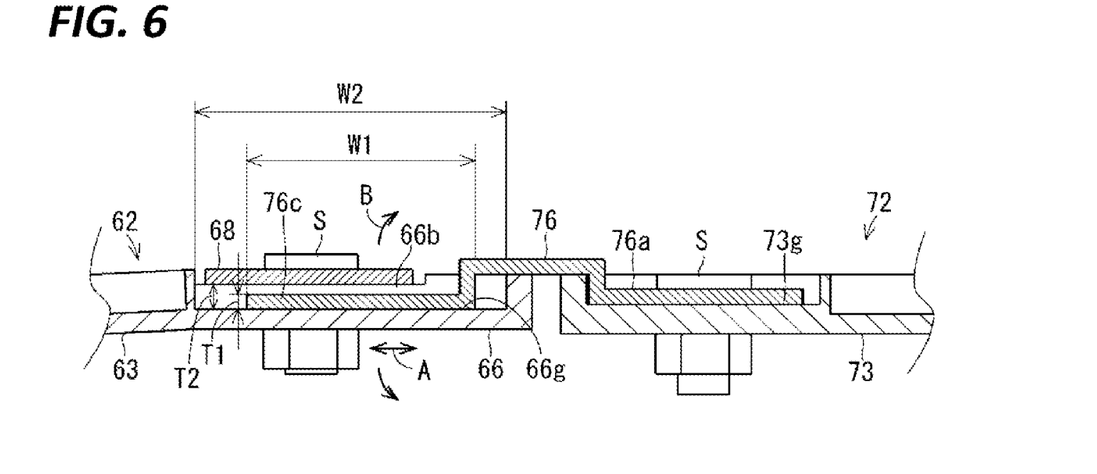
FIG. 6 is a cross-sectional view taken along the line VI-VI in FIG. 4.

The rigid members 60 will now be described in more detail. FIG. 3 is a perspective view showing a rigid member 60. FIG. 4 is a partially enlarged perspective view of the rigid member 60. FIG. 5 is a partially exploded perspective view of the rigid member 60. FIG. 6 is a cross-sectional view taken along the line VI-VI in FIG. 4.

Each of the rigid members 60 includes a plurality of divided members 62, 72, and 82. In the present embodiment, the rigid member 60 as a whole has a rectangular plate shaped that is flat along the roof panel 13 and is elongated in the vehicle width direction. The rigid member 60 is divided into a plurality of (here, three) divided members 62, 72, and 82 in the longitudinal direction thereof (i.e., the vehicle width direction). The divided member 72 is provided at the center in the longitudinal direction (i.e., the vehicle width direction), and the divided members 62 and 82 are provided at opposite ends of the central divided member 72 in the longitudinal direction (i.e., the vehicle width direction).

The divided members 62, 72, and 82 each have a flat shape, more specifically, a rectangular plate shape. The divided members 62, 72, and 82 each have a configuration in which rib parts protrude vertically and horizontally from one principal surface (here, an upper surface) of a flat bottom plate part thereof. Thus, both reduced weight and increased rigidity are achieved. Each of the divided members may have a shape in which a honeycomb rib protrudes therefrom. The divided members may be flat on two surfaces thereof. The divided member may be a plate-shaped member having an internal hollow structure.

The plurality of divided members 62, 72, and 82 are correspondingly provided with a plurality of attachment parts 62a, 72a, and 82a configured to be attached to a mounting target portion. Each of the attachment parts 62a, 72a, and 82a may be a hole to which a clip member is locked, or may be a hole for screwing or riveting. Each of the attachment parts 62a, 72a, and 82a may be a clip member configured to be locked to a hole that is formed in the roof-reinforcing member 14, or may be a screw configured to be screwed to the roof-reinforcing member 14. In the present embodiment, each of the attachment parts 62a, 72a, and 82a is a through hole to which a clip member 14P protruding from the roof-reinforcing members 14 is to be locked.

The attachment parts 62a, 72a, and 82a may be provided in each of the plurality of divided members 62, 72, and 82, or may be provided in two or more of the plurality of divided members 62, 72, and 82. In the present embodiment, the attachment parts 62a, 72a, and 82a are provided in each of the plurality of divided members 62, 72, and 82. More specifically, the attachment parts 62a, 72a, and 82a are provided at four corners of each of the plurality of divided members 62, 72, and 82. Any number of attachment parts may be provided in the divided members 62, 72, and 82.

Holes 62h, 72h, and 82h for fixing the roof-side device 50 and the like may be correspondingly formed in the divided members 62, 72, and 82.

At least one coupling portion of the plurality of divided members 62, 72, and 82, the divided members 62, 72, and 82 are coupled so as to be displaceable to each other. The coupling portion where displacement is possible is provided between the plurality of attachment parts 62a, 72a, and 82a.

When two or more of the plurality of divided members 62, 72, and 82 are provided with the attachment parts 62a, 72a, and 82a, there may be a shift between the positional relationship of the attachment parts 62a, 72a, and 82a and the positional relationship of a plurality of attachment target portions (e.g., the clip members 14P) of the roof-reinforcing member 14 to which the attachment parts 62a, 72a, and 82a are attached. In this case, the aforementioned positional shift can be eliminated as a result of the plurality of divided members 62, 72, and 82 being displaced relative to each other at the coupling portion provided between the coupling plurality of attachment parts 62a, 72a, and 82a.

In the present embodiment, all of the plurality of divided members 62, 72, and 82 are provided with the attachment parts 62a, 72a, and 82a. In addition, the divided members 62 and 72 are coupled so as to be displaceable relative to each other, and the divided members 72 and 82 are coupled so as to be displaceable relative to each other. Accordingly, if the positions of the attachment parts 62a and 72a are shifted relative to the plurality of attachment target portions of the roof-reinforcing member 14 when attaching the rigid members 60 to the roof-reinforcing member 14, the divided members 62 and 72 can be displaced relative to each other. This can facilitate attachment of the attachment parts 62a and 72a to the plurality of attachment target portions of the roof-reinforcing member 14. Similarly, if the positions of the attachment parts 72a and 82a are shifted relative to the plurality of attachment target portions of the roof-reinforcing member 14, attachment of the attachment parts 72a and 82a to the plurality of attachment target portions of the roof-reinforcing member 14 can be facilitated as a result of the divided members 72 and 82 being displaced relative to each other.

Note that it is not essential that all of the divided members 62, 72, and 82 are coupled so as to be displaced relative to each other. Even when some coupling portions are coupled so as to be displaced relative to each other, positional shifting can be eliminated on two sides of the coupling portions in the same manner as described above.

A description focusing on the coupling portion between the divided members 62 and 72 will be given. Note that the same configuration can be applied to the coupling portion between the divided members 72 and 82.

The divided members 62 and 72 are coupled so as to be displaceable relative to each other. It is sufficient that the divided members 62 and 72 are displaceable relative to each other in at least one direction. The divided members 62 and 72 may be coupled so as to be movable toward and away from each other (see the arrow A in FIG. 6), to be swingable in the thickness direction of the sheet-shaped member 30 (see the arrow B in FIG. 6), and to be swingable in a direction (also the front-rear direction of the vehicle 10, see the arrow C in FIG. 4) intersecting a direction in which the plurality of divided members 62 and 72 move toward or away from each other and the thickness direction of the sheet-shaped member 30. In the present embodiment, a configuration for such coupling will be described.

The divided member 72 includes a main body part 73 that extends in a plate shape, and a coupling piece 76. The coupling piece 76 is attached to an edge portion of the main body part 73 on the divided member 62 side. The coupling piece 76 extends toward the divided member 62 side along the extension direction of the sheet-shaped member 30.

The divided member 62 includes a main body part 63 that extends in a plate shape, a first clamping piece 66, and a second clamping piece 68. The first clamping piece 66 and the second clamping piece 68 are provided at an edge portion of the main body part 63 on the divided member 72 side. The first clamping piece 66 and the second clamping piece 68 extend along the direction of the sheet-shaped member 30. The first clamping piece 66 and the second clamping piece 68 oppose each other in the thickness direction of the main body part 63 so as to overlap each other in a plan view of the divided member 62. A gap T2 having a dimension greater than or equal to a thickness T1 of the coupling piece 76 is formed between the first clamping piece 66 and the second clamping piece 68. Also, the divided members 62 and 72 are coupled to each other, with the coupling piece 76 being disposed between the first clamping piece 66 and the second clamping piece 68. Accordingly, the divided members 62 and 72 can swing in the thickness direction of the sheet-shaped member 30 within a range in which the coupling piece 76 can move between the first clamping piece 66 and the second clamping piece 68, while excessive sagging that may impede mounting is suppressed.

More specifically, in the divided member 72 described above, the main body part 73 and the coupling piece 76 are formed as separate pieces. For example, the main body part 73 may be made of resin, and the coupling piece 76 may be formed using a metal plate. The coupling piece 76 may be made of resin. The coupling piece 76 is attached to a lateral portion of the main body part 73 so as to protrude outward. In the present embodiment, an elongated recessed groove part 73g is formed along a lateral portion of one surface (an upper surface) of the main body part 73 on the divided member 62 side. A lateral attachment part 76a of the coupling piece 76 on a side that is attached to the main body part 73 is formed in a shape that protrudes relative to the center in the width direction of the coupling piece 76 via a stepped part. Also, with the lateral attachment part 76a being disposed in the recessed groove part 73g so as to be in contact with a bottom surface of the recessed groove part 73g, the lateral attachment part 76a is fixed to a bottom portion of the recessed groove part 73g using a screw S.

The configuration for attaching the coupling piece 76 to the main body part 73 is not limited to the above-described example, and it is possible to adopt other structures such as a rivet fixing structure and a welding fixing structure. It is not essential that the coupling piece 76 is a separate piece from the main body part 73, and the coupling piece 76 and the main body part 73 may be molded into a single piece using resin.

A lateral portion of the coupling piece 76 on the divided member 62 side is formed as a lateral protrusion 76c that protrudes relative to the center in the width direction of the coupling piece 76 via a stepped part toward one surface side (lower surface side) of the coupling piece 76. The lateral protrusion 76c extends along a boundary between the divided members 62 and 72.

The first clamping piece 66 on the divided member 62 side is an elongated portion of the main body part 63 that extends along a lateral portion on the divided member 72 side. Here, the main body part 63 and the first clamping piece 66 are molded into a single piece using resin.

A recessed groove part 66g that extends along the boundary between the divided members 62 and 72 is formed in the first clamping piece 66. The recessed groove part 66g is an elongated groove that extends along the boundary. The planar size of the recessed groove part 66g is set to be larger than that of the lateral protrusion 76c. For example, in a direction in which the divided members 62 and 72 move toward or away from each other (a direction in which the divided members 62 and 72 are arranged side by side), a width W2 of the recessed groove part 66g is larger than a width W1 of the lateral protrusion 76c. For example, in the direction of the boundary between the divided members 62 and 72, the length of the recessed groove part 66g is larger than the length of the lateral protrusion 76c. The lateral protrusion 76c can be housed in the recessed groove part 66g. Since there is a margin in the above-described size in a state in which the lateral protrusion 76c is housed in the recessed groove part 66g, the lateral protrusion 76c can move inside the recessed groove part 66g.

A pair of supporting protrusions 66b that protrude past a bottom surface of the recessed groove part 66g are formed outside opposite ends of the recessed groove part 66g in the longitudinal direction. Four sides around the recessed groove part 66g are surrounded by wall surfaces. The protruding length of the supporting protrusions 66b from the bottom surface of the recessed groove part 66g is larger than the thickness T1 of the coupling piece 76. Here, a recess in which an end portion of the coupling piece 76 can be fitted is formed in each of the supporting protrusions 66b, and the height of a bottom surface of the recess relative to the bottom surface of the recessed groove part 66g corresponds to the protruding length of the supporting protrusion 66b. The dimension T2 of the gap can be set according to the protruding length.

The second clamping piece 68 is formed as a separate piece from the main body part 63. The second clamping piece 68 may be a metal plate, for example. The second clamping piece 68 has a rectangular plate shape that is longer than the recessed groove part 66g. The second clamping piece 68 is attached to the first clamping piece 66 at a fixed position, with opposite end portions of the second clamping piece 68 respectively being in contact with the supporting protrusions 66b. For example, with opposite end portions of the second clamping piece 68 being placed on top of the two supporting protrusions 66b, the end portions of the second clamping piece 68 are screwed to the supporting protrusions 66b using screws S. The fixing of these portions may be achieved by other means such as riveting.

By attaching the second clamping piece 68 to the first clamping piece 66 with the lateral protrusion 76c being housed in the recessed groove part 66g, the lateral protrusion 76c of the coupling piece 76 is sandwiched between the first clamping piece 66 and the second clamping piece 68. In this state, the second clamping piece 68 opposes the coupling piece 76 on a side opposite to the first clamping piece 66, and keeps the lateral protrusion 76c housed in the recessed groove part 66g.

Since the second clamping piece 68 is in contact with the supporting protrusions 66b, a gap having the dimension T2 is secured between the bottom of the recessed groove part 73g and the second clamping piece 68 according to the protruding length of the supporting protrusion 66b. Accordingly, within a range in which the coupling piece 76 can move between the first clamping piece 66 and the second clamping piece 68, the divided members 62 and 72 can swing in a thickness direction B of these members. The lateral protrusion 76c can move inside the wall surfaces surrounding the four sides of the recessed groove part 66g. In particular, in a direction in which the divided members 62 and 72 are disposed side by side, the width W2 of the recessed groove part 66g is larger than the width W1 of the lateral protrusion 76c. This larger width allows the lateral protrusion 76c to move inside the recessed groove part 66g, whereby the divided members 62 and 72 can move relative to each other in a direction A in which they move toward or away from each other. Portions of the lateral protrusion 76c can separately move at longitudinal long ends of the recessed groove part 66g. For example, the lateral protrusion 76c can move such that one end portion of the lateral protrusion 76c is biased in the recessed groove part 66g toward the main body part 63, and another end portion of the lateral protrusion 76c is biased in the recessed groove part 66g in a direction away from the main body part 63, or vice versa. Thus, the divided members 62 and 72 can also be moved relative to each other so as to swing in a front-rear direction C of the vehicle.

With the wiring module 20 configured in this manner, the divided members 62, 72, and 82 are coupled so as to be displaceable between the plurality of attachment parts 62a, 72a, and 82a. Accordingly, when the wiring module 20 is mounted to the roof portion 11 serving as the mounting target portion, the plurality of attachment parts 62a, 72a, and 82a are aligned with the position of an attachment target portion of the roof-reinforcing member 14, serving as the mounting target portion, of the roof portion 11 as a result of the divided members 62, 72, and 82 being displaced relative to each other. Thus, the rigid member 60 can be easily attached to the roof-reinforcing member 14, and the wiring module 20 can be easily incorporated into a roof or the like serving as the mounting target portion.

For example, the roof-reinforcing member 14 to which the rigid member 60 is attached is welded to the roof panel 13, and therefore there may be a significant position error. Even in such a case, the rigid member 60 can be easily attached to the roof-reinforcing member 14 by displacing the divided members 62, 72, and 82 relative to each other according to the position error.

Depending on the front-rear position of the vehicle, the roof panel 13 may have different degrees of bending, or have varied widths. Even in such a case, the plurality of divided members 62, 72, and 82 can be displaced according to the degree of bending or the width corresponding to the position of the roof panel 13. Thus, rigid members 60 having the same shape can be easily attached to different locations of the roof panel 13. Furthermore, the roof panel 13 may have different shapes and sizes depending on the type of vehicle, or the like. Even in this case, the plurality of divided members 62, 72, and 82 can be displaced according to the degree of bending or the width of the roof panel 13. Thus, rigid members 60 having the same shape can be easily attached to vehicles of different types. This allows the rigid members 60 to be mounted to various locations or various types of vehicles, thus making the rigid members 60 versatile.

When the plurality of divided members 62, 72, and 82 are coupled so as to be movable toward and away from each other, to be swingable in the thickness direction of the sheet-shaped member 30, and to be swingable in a direction (the vehicle front-rear direction) intersecting a direction in which the plurality of divided members 62, 72, and 82 move toward or away from each other and the thickness direction of the sheet-shaped member 30, it is possible to move the plurality of attachment parts 62a, 72a, and 82a relative to each other in three directions, to adjust their positions relative to each other. Thus, the wiring module 20 is easily incorporated into the mounting target portion of the vehicle 10.

The divided members 62, 72, and 82 are coupled to each other, with the coupling piece 76 being disposed between the first clamping piece 66 and the second clamping piece 68. Accordingly, the divided members 62, 72, and 82 can swing in the thickness direction of the sheet-shaped member 30 within a range in which the coupling piece 76 can move between the first clamping piece 66 and the second clamping piece 68. This makes it possible to adjust the positions of the attachment parts 62a, 72a, and 82a while suppressing excessive sagging of the sheet-shaped member 30, thus contributing to an increase in the ease of mounting of the wiring module 20.

With the lateral protrusion 76c of the coupling piece 76 being housed in the recessed groove part 66g, the second clamping piece 68 opposes the coupling piece 76 on a side opposite to the first clamping piece 66, and keeps the lateral protrusion 76c housed in the recessed groove part 66g. Accordingly, the divided members 62, 72, and 82 can be coupled so as to be movable in a direction toward or away from each other, and to be swingable in the front-rear direction C of the vehicle 10 within a range in which the lateral protrusion 76c can move in the recessed groove part 66g.

Since the coupling piece 76 is formed as a separate piece from the main body part 73, it is possible to adjust the distance between the divided members 62, 72, and 82, or adjust the displaceable amount therebetween by adjusting the shape of the coupling piece 76. For example, it is possible to increase the distance between the divided members 62, 72, and 82 by increasing the width of the central portion of the coupling piece 76, thus increasing the overall length of the rigid member 60. For example, it is possible to adjust the amount by which the lateral protrusion 76c can be displaced in the recessed groove part 66g by adjusting the width or the thickness of the lateral protrusion 76c. This makes it possible to extend the range of applicable shapes of the rigid members 60, while using the same shape for the main body parts 63 and 73.

The second clamping piece 68 is attached to the first clamping piece 66 at a fixed position, with opposite end portions of the second clamping piece 68 being in contact with the two supporting protrusions 66b. Accordingly, the dimension T2 of the gap between the first clamping piece 66 and the second clamping piece 68 can be easily kept constant, and the amount by which the coupling piece 76 can be varied between the first clamping piece 66 and the second clamping piece 68, or in other words, the relative variable amount (in particular, the variable amount in the direction B) of the divided members 62, 72, and 82 can be easily kept constant.

Embodiment 2

Figure 7:
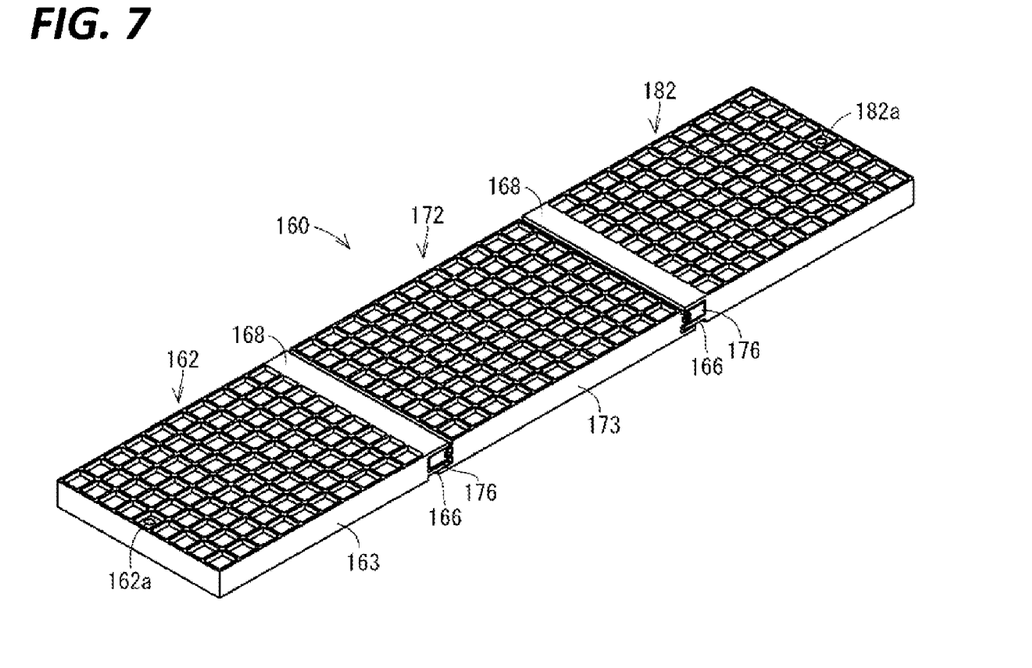
FIG. 7 is a perspective view showing a rigid member.
Figure 8:
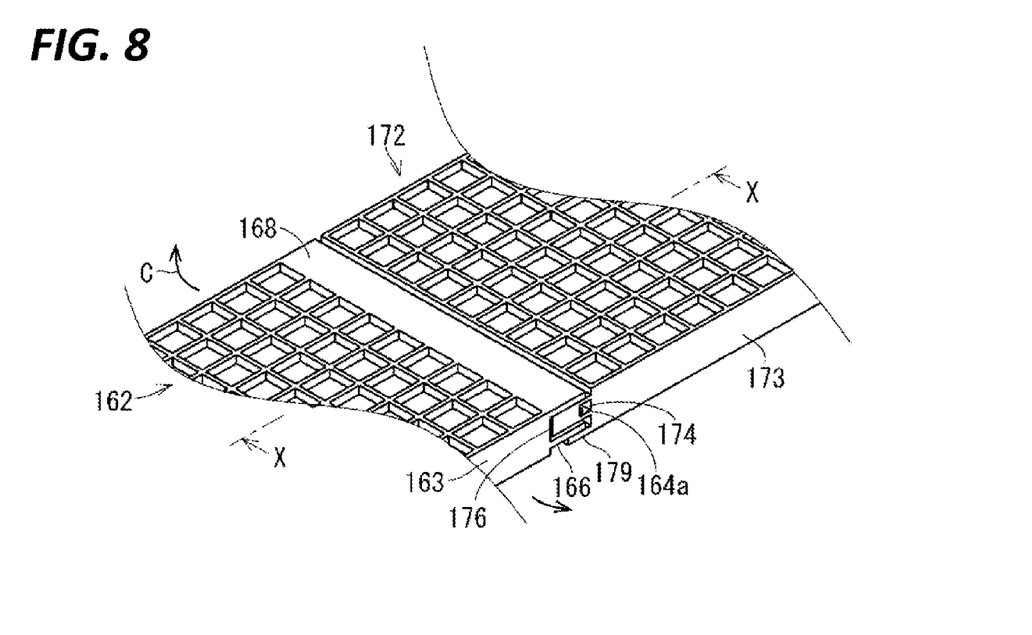
FIG. 8 is a partially enlarged perspective view of the rigid member.
Figure 9:
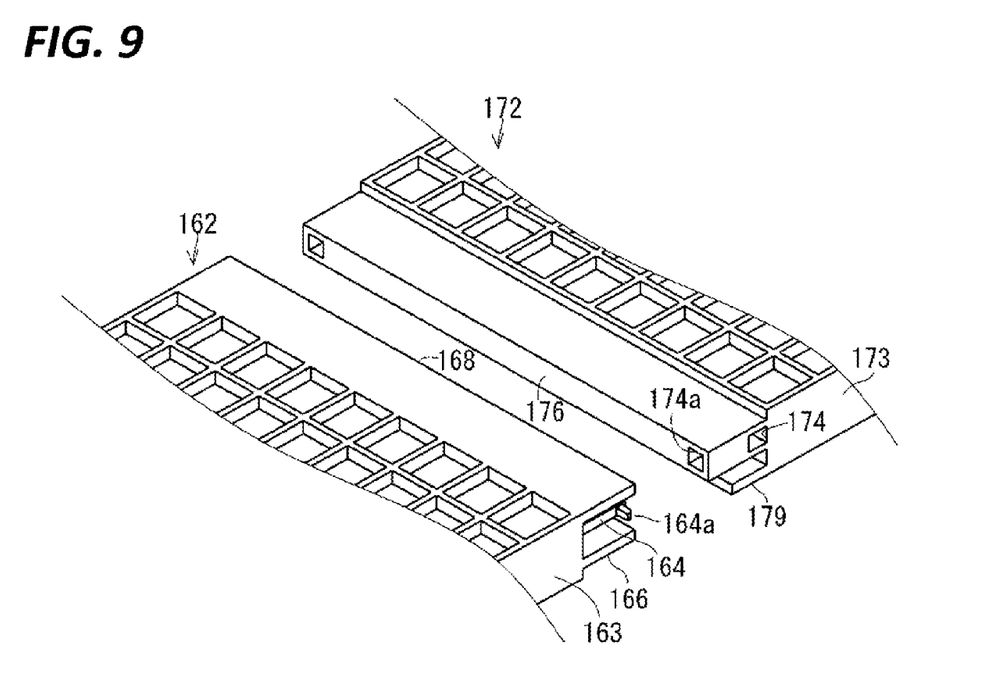
FIG. 9 is a partially exploded perspective view of the rigid member.
Figure 10:
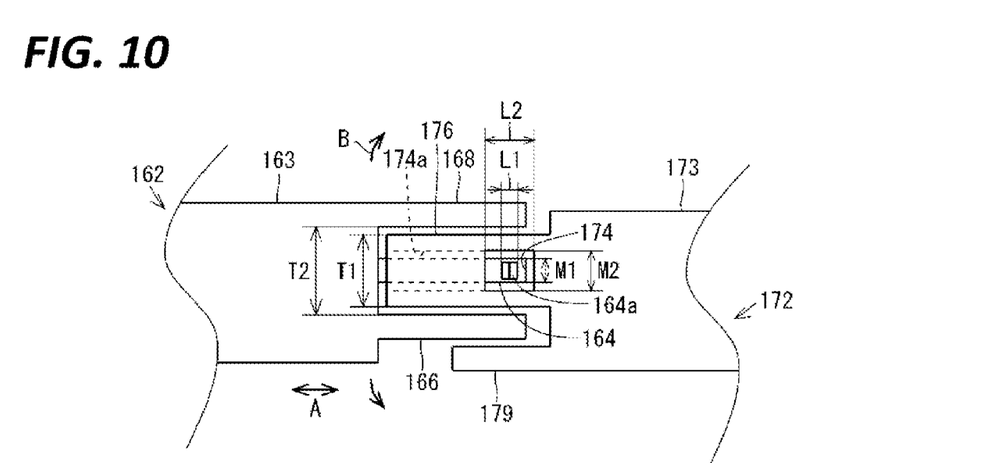
FIG. 10 is a cross-sectional view taken along the line X-X in FIG. 8.

A rigid member 160 that can be applied to a wiring module according to Embodiment 2 will be described. FIG. 7 is a perspective view showing a rigid member 160. FIG. 8 is a partially enlarged perspective view of the rigid member 160. FIG. 9 is a partially exploded perspective view of the rigid member 160. FIG. 10 is a cross-sectional view taken along the line X-X in FIG. 8. In the description of the present embodiment, the same constituent elements as those described in Embodiment 1 are denoted by the same reference numerals, and the descriptions thereof have been omitted.

The rigid member 160 is attached to the sheet-shaped member 30 in place of the rigid member 60 described in the first embodiment. The rigid member 160 includes divided members 162, 172, and 182 that correspond to the divided members 62, 72, and 82 described above.

As in the case of the attachment parts 62a, 72a, and 82a, the rigid member 160 is provided with attachment parts 162a and 182a. FIG. 7 shows an example in which the divided member 162 is provided with the attachment part 162a, and the divided member 182 is provided with the attachment part 182a. As described above, the attachment parts 162a and 182a may be provided at any positions of the rigid member 160. It is sufficient that the plurality of attachment parts 162a and 182a are separately provided on two or more divided members 162 and 182, and that portions where the divided members 162, 172, and 182 are coupled so as to be displaceable are present between the plurality of attachment parts 162a and 182a.

A description focusing on the coupling portion between the divided members 162 and 172 will be given. Note that the same configuration can be applied to the coupling portion between the divided members 172 and 182.

The divided members 162 and 172 are coupled so as to be displaceable relative to each other. It is sufficient that the divided members 162 and 172 are displaceable relative to each other in at least one direction. The divided members 162 and 172 may be coupled so as to be movable toward and away from each other (see the arrow A in FIG. 10), to be swingable in the thickness direction of the sheet-shaped member 30 (also the thickness direction of the rigid member 160, see the arrow B in FIG. 10), and to be swingable in a direction (see the arrow C in FIG. 8) intersecting a direction in which the plurality of divided members 162 and 172 move toward or away from each other and the direction of the sheet-shaped member 30. In the present embodiment, a configuration for such coupling will be described.

The divided member 172 includes a main body part 173 that extends in a plate shape, and a coupling piece 176. The coupling piece 176 is provided at an edge portion of the main body part 173 on the divided member 162 side. The coupling piece 176 extends toward the divided member 162 side along the extension direction of the sheet-shaped member 30.

More specifically, the main body part 173 and the coupling piece 176 are molded into a single piece using resin. The coupling piece 176 protrudes from an intermediation portion, in the thickness direction, of a side surface of the main body part 173 on the divided member 162 side.

The divided member 162 includes a main body part 163 that extends in a plate shape, a first clamping piece 166, and a second clamping piece 168. The first clamping piece 166 and the second clamping piece 168 are provided at an edge portion of the main body part 163 on the divided member 172 side. The first clamping piece 166 and the second clamping piece 168 extend along the direction of the sheet-shaped member 30.

Here, the main body part 163, the first clamping piece 166, and the second clamping piece 168 are molded into a single piece using resin. The first clamping piece 166 protrudes toward the divided member 172 side from a position of the main body part 163 that is located toward a lower surface of the main body part 163. The second clamping piece 168 protrudes toward the divided member 172 side from a position of the main body part 163 that is located toward an upper surface of the main body part 163.

The first clamping piece 166 and the second clamping piece 168 oppose each other in the thickness direction of the main body part 163 so as to overlap each other in a plan view of the divided member 162. A gap T2 having a dimension greater than or equal to a thickness T1 of the coupling piece 176 is formed between the first clamping piece 166 and the second clamping piece 168. Also, the divided members 162 and 172 are coupled to each other, with the coupling piece 176 being disposed between the first clamping piece 166 and the second clamping piece 168. Accordingly, the divided members 162 and 172 can swing in the thickness direction of the sheet-shaped member 30 within a range in which the coupling piece 176 can move between the first clamping piece 166 and the second clamping piece 168, while excessive sagging that may impede mounting is suppressed.

One of the divided members 162 and 172 is provided with at least one locking piece 164, and the other is provided with at least one receiving recess 174. The present embodiment describes an example in which the divided member 162 is provided with the locking piece 164, and the divided member 172 is provided with the receiving recess 174. In contrast to this, a divided member including a pair of clamping pieces may be provided with a receiving recess, and a divided member including a coupling piece may be provided with a locking piece.

The locking piece 164 is shaped such that a locking protrusion 164a protrudes from a distal end portion of an elongated portion thereof. The locking protrusion 164a is shaped so as to have a portion whose protruding length gradually decreases toward the distal end portion of the locking piece 164, for example. A surface of the locking protrusion 164a that faces a proximal end side of the locking piece 164 may be orthogonal to the extension direction of the locking piece 164.

The locking piece 164 is provided between the first clamping piece 166 and the second clamping piece 168. Here, a pair of locking pieces 164 are provided at opposite ends in the extension direction of the first clamping piece 166 and the second clamping piece 168. The locking pieces 164 protrude between the first clamping piece 166 and the second clamping piece 168 on a side surface of the main body part 163 that faces the second divided member 172. The locking protrusions 164a protrude between the first clamping piece 166 and the second clamping piece 168 so as to face outward in the longitudinal direction of thereof.

The receiving recess 174 is formed in the coupling piece 176 of the divided member 172. More specifically, receiving recesses 174 are formed in opposite end portions of the coupling piece 176 in the longitudinal direction. Here, square bottomed hole portions 174a extending from end portions of the coupling piece 176 on the divided member 172 side toward the main body part 173 are formed. A receiving recess 174 is formed at the back of each of the bottomed hole portions 174a. The bottomed hole portion 174a is formed to have a size and a depth that allow insertion of the locking piece 164. The receiving recess 174 is formed in a shape that is recessed (here, open outward) relative to a side surface located at the back of the bottomed hole portion. The receiving recess 174 is formed to have a size that allows the locking protrusion 164a to be disposed therein. The receiving recess 174 is set to a size that allows movement of the locking protrusion 164a in the thickness direction of the sheet-shaped member 30 (the divided members 162 and 172) and a direction in which the divided members 162 and 172 move toward or away from each other. More specifically, a dimension L2 of the receiving recess 174 is larger than a dimension L1 of the locking protrusion 164a in the direction A (direction in which the divided members 162 are 172 arranged side by side) in which the divided members 162 and 172 move toward or away from each other. Accordingly, the locking protrusion 164a can move in the receiving recess 174 in the direction A. In addition, a dimension M2 of the receiving recess 174 is larger than a dimension M1 of the locking protrusion 164a in the thickness direction of the divided members 162 and 172. Accordingly, the locking protrusion 164a can also move in the receiving recess 174 in the thickness direction of the divided members 162 and 172.

Although the receiving recess 174 is formed in the coupling piece 176 in the present embodiment, this is not always necessary. A protruding piece may be formed separately from the coupling piece 176, and the receiving recess may be formed in the protruding piece.

The divided member 172 is provided with an auxiliary piece 179 capable of coming into contact with an outer surface of at least one of the first clamping piece 166 and the second clamping piece 168. Here, the auxiliary piece 179 is provided at a portion of a surface of the main body part 173 that faces the divided member 162 side and that opposes the coupling piece 176 via the first clamping piece 166. The auxiliary piece 179 is molded into a single piece with the main body part 173 using resin.

A gap having a size larger than the thickness of the first clamping piece 166 is formed between the coupling piece 176 and the auxiliary piece 179. Accordingly, the first clamping piece 166 can move between the coupling piece 176 and the auxiliary piece 179 in the thickness direction of the divided members 162 and 172. However, the divided member 162 is supported relative to the divided member 172, as a result of which the auxiliary piece 179 comes in contact with an outward facing surface (downward facing surface) of the first clamping piece 166, with the locking protrusions 164a being in contact with a lower edge in the receiving recess 174. Accordingly, when the divided members 162 are 172 are displaced relative to each other, the load of the divided member 162 can be received not only between the locking protrusions 164a and the receiving recesses 174, but also by the auxiliary piece 179 in a dispersed manner. Thus, the divided members 162 and 172 are less likely to be separated from each other.

It is preferable that the protruding length of the auxiliary piece 179 from a side surface of the main body part 173 is set to be smaller than the protruding length of the coupling piece 176. Thus, it is possible to prevent the auxiliary piece 179 from impeding relative displacement of the divided members 162 and 172.

With the rigid member 160, a pair of locking pieces 164 are inserted into the bottomed hole portions 174a while the coupling piece 176 is disposed between the first clamping piece 166 and the second clamping piece 168. Then, the locking protrusions 164a come into contact with an outer side surface in the corresponding bottomed hole portions 174a, whereby the locking pieces 164 are elastically deformed. When the locking protrusions 164a reach the corresponding receiving recesses 174, the locking pieces 164 are restored to their original shape, resulting in a state in which the locking protrusions 164a are fitted into the corresponding receiving recesses 174.

In this state, within a range in which the locking protrusions 164a can move in the corresponding receiving recesses 174, and in which the coupling piece 176 can move between the first clamping piece 166 and the second clamping piece 168, the divided members 162 and 172 can be displaced relative to each other in the thickness direction B of the sheet-shaped member 30 (the thickness direction of the divided members 162 and 172), and the direction A in which the divided members 162 and 172 move toward or away from each other. Since the locking protrusions 164a can move in the corresponding receiving recesses 174 along the direction A at opposite ends of the coupling piece 176, consequently the locking protrusions 164 can be located close to the main body part 173 on one end side of the coupling piece 176, and the locking protrusions 164a can be located away from the main body part 173 at the other end side of the coupling piece 176, or vice versa. As a result, the divided members 162 and 172 can also swing and be displaced relative to each other in the front-rear direction C of the vehicle 10.

As in the case of Embodiment 1 described above, a wiring module including the rigid member 160 in this manner also can facilitate a mounting operation to the mounting target portion.

The divided members 162 and 172 can swing and be displaced in the thickness direction of the sheet-shaped member 30 within a range in which the coupling piece 176 can move between the first clamping piece 166 and the second clamping piece 168.

With a configuration in which the locking protrusions 164a move in the receiving recesses 174, the divided members 162 and 172 can be displaced relative to each other in multiple directions while being coupled to each other, using a relatively simple configuration Since the locking pieces 164 are provided between the first clamping piece 166 and the second clamping piece 168, the locking pieces 164 are protected between the first clamping piece 166 and the second clamping piece 168.

Furthermore, a load generated when the divided members 162 and 172 are displaced is received by the auxiliary piece 179 in a dispersed manner. Accordingly, it is possible to prevent an excessive load from acting on the locking protrusions 164a.

MODIFICATIONS

In Embodiments 1 and 2, the divided members 72 and 172 are examples of the first divided member including the coupling piece, and the divided members 62 and 162 are examples of the second divided member including the first clamping piece and the second clamping piece. In contrast to these examples, the central divided member may be the second divided member including the first clamping piece and the second clamping piece, and the divided member located at an end may be the first divided member including the coupling piece.

The rigid member may be divided in any number and in any direction. The rigid member may be divided into two, or four or more. The rigid member may be divided along lines extending along the vehicle width direction.

It should be appreciated that the configurations described in the embodiments and the modifications may be combined as appropriate as long as there are no mutual inconsistencies.

LIST OF REFERENCE NUMERALS

10 Vehicle
11 Roof portion
12 Body
13 Roof panel
13h Antenna hole
14 Roof-reinforcing member
14P Clip member
16 Interior member
20 Wiring module
30 Sheet-shaped member
40 Transmission member
50 Roof-side device
60, 160 Rigid member
62, 72, and 82, 162, 172, 182 Divided member
62a, 72a, 82a, 162a and 182a Attachment part
62h, 72h, 82h Hole
63, 73, 163, 173 Main body part
66, 166 First clamping piece
66b Supporting protrusion
66g Recessed groove part
68, 168 Second clamping piece
73g Recessed groove part
76, 176 Coupling piece
76a Lateral attachment part
76c Lateral protrusion
164 Locking piece
164a Locking protrusion
174 Receiving recess
174a Bottomed hole portion
S Screw

What is claimed is:
1. A wiring module comprising:
a sheet-shaped member that extends in a planar shape relative to a mounting target portion of a vehicle;

a transmission member held by the sheet-shaped member; and a rigid member provided on the sheet-shaped member, wherein the rigid member includes a plurality of divided members, the rigid member is provided with a plurality of attachment parts configured to be attached to the mounting target portion, the plurality of divided members include a first divided member and a second divided member that are coupled so as to be displaceable to each other, and a coupling portion between the first divided member and the second divided member is provided between the plurality of attachment parts.

2. The wiring module according to claim 1, wherein the first divided member and the second divided member are coupled so as to be movable toward and away from each other, to be swingable in a thickness direction of the sheet-shaped member, and to be swingable in a direction intersecting a direction in which the plurality of divided members move toward or away from each other and the thickness direction of the sheet-shaped member.

3. The wiring module according to claim 1, wherein the first divided member includes a coupling piece that extends toward the second divided member side along a direction of the sheet-shaped member, the second divided member includes a first clamping piece and a second clamping piece that extend along the direction of the sheet-shaped member, a gap having a dimension greater than or equal to a thickness of the coupling piece is formed between the first clamping piece and the second clamping piece, and the first divided member and the second divided member are coupled to each other, with the coupling piece being disposed between the first clamping piece and the second clamping piece.

4. The wiring module according to claim 3, wherein the coupling piece includes a protrusion that extends along a boundary between the first divided member and the second divided member, and that protrudes toward one surface side of the coupling piece, the first clamping piece extends along the boundary between the first divided member and the second divided member, a recessed groove part capable of housing the protrusion is formed in the first clamping piece, the protrusion has a dimension larger than a dimension of the recessed groove part in the direction in which the first divided member and the second divided member move toward or away from each other, and the second clamping piece opposes the coupling piece on a side opposite to the first clamping piece, and keeps the protrusion housed in the recessed groove part.

5. The wiring module according to claim 4, wherein the first divided member includes a first main body part that is flat, and the coupling piece is formed as a separate piece from the first main body part, and is attached to a lateral portion of the first main body part so as to protrude outward.

6. The wiring module according to claim 4, wherein the second divided member includes a second main body part that is flat, the first clamping piece is formed as a single piece with the second main body part, the second clamping piece is formed as a separate piece from the second main body part, the first clamping piece includes a pair of supporting protrusions that support the first clamping piece outside opposite ends of the recessed groove part, and opposite end portions of the second clamping piece are attached to the first clamping piece at fixed positions, while in contact with the pair of supporting protrusions.

7. The wiring module according to claim 3, wherein one of the first divided member and the second divided member is provided with a pair of locking pieces each including a locking protrusion, the other of the first divided member and the second divided member is provided with a pair of receiving recesses in which the corresponding locking protrusions can be disposed, and each of the receiving recesses is set to a size that allows movement of the corresponding locking protrusion in the thickness direction of the sheet-shaped member and the direction in which the first divided member and the second divided member move toward or away from each other.

8. The wiring module according to claim 7, wherein the locking pieces are provided between the first clamping piece and the second clamping piece on the second divided member.

9. The wiring module according to claim 7, wherein the first divided member includes an auxiliary piece capable of coming into contact with an outer surface of at least one of the first clamping piece and the second clamping piece.

* * * * *